(12) United States Patent
Gustavsson

(10) Patent No.: US 6,366,848 B1
(45) Date of Patent: Apr. 2, 2002

(54) ENGINE CONTROL SYSTEM FOR PROVIDING INCENTIVE TO DRIVERS

(75) Inventor: Tommy G. Gustavsson, Greensboro, NC (US)

(73) Assignee: Volvo Trucks North America, Inc., Greensboro, NC (US)

( * ) Notice: Subject to any disclaimer, the term of this patent is extended or adjusted under 35 U.S.C. 154(b) by 0 days.

(21) Appl. No.: 09/664,882

(22) Filed: Sep. 19, 2000

(51) Int. Cl.$^7$ ................................................ G06F 19/00
(52) U.S. Cl. ...................... 701/123; 123/351; 340/439
(58) Field of Search .......................... 701/123, 29, 30, 701/34, 35, 36, 45; 123/351; 340/439

(56) References Cited

U.S. PATENT DOCUMENTS

| | | | |
|---|---|---|---|
| 4,101,870 A | 7/1978 | Ekman | 340/53 |
| 4,258,421 A | 3/1981 | Juhasz et al. | 364/424 |
| 4,286,683 A | 9/1981 | Zeigner et al. | 180/54 R |
| 4,500,868 A | 2/1985 | Tokitsu et al. | 340/52 F |
| 4,843,578 A | 6/1989 | Wade | 364/565 |
| 4,858,133 A | 8/1989 | Takeuchi et al. | 364/424.04 |
| 5,303,163 A | 4/1994 | Ebaugh et al. | 364/550 |
| 5,305,216 A | 4/1994 | Okura et al. | 364/424.01 |
| 5,365,436 A | 11/1994 | Schaller et al. | 364/424.03 |
| 5,394,136 A | 2/1995 | Lammers et al. | 340/439 |
| 5,445,128 A | 8/1995 | Letang et al. | 123/436 |
| 5,477,827 A | 12/1995 | Weisman, II et al. | 123/436 |
| 5,499,182 A | 3/1996 | Ousborne | 364/424.04 |
| 5,732,676 A | 3/1998 | Weisman et al. | 123/436 |
| 5,754,965 A | * 5/1998 | Hagenbuch | 701/35 |
| 5,758,299 A | 5/1998 | Sandborg et al. | 701/29 |
| 5,815,070 A | 9/1998 | Yoshikawa | 340/439 |
| 5,844,473 A | 12/1998 | Kaman | 340/439 |
| 5,884,210 A | 3/1999 | Rettig et al. | 364/550 |
| 5,890,080 A | 3/1999 | Coverdill et al. | 701/29 |
| 5,892,434 A | 4/1999 | Carlson et al. | 340/438 |
| 5,954,617 A | 9/1999 | Horgan et al. | 477/107 |
| 5,957,986 A | 9/1999 | Coverdill | |
| 6,026,784 A | 2/2000 | Weisman et al. | 123/436 |
| 6,092,021 A | 7/2000 | Ehlbeck et al. | 701/123 |

OTHER PUBLICATIONS

Internet article at www.cummins,com/onhigh/rrelay.html, "RoadRelay™4:Cutting Edge Technology for Bottom–Line Results", Cummins Engine Company, Inc, author unknown (1999).

(List continued on next page.)

*Primary Examiner*—Yonel Beaulieu
(74) *Attorney, Agent, or Firm*—Watts, Hoffmann, Fisher & Heinke Co. L.P.A.

(57) ABSTRACT

A method of providing an incentive in the form of increased allowable vehicle operating speed for meeting a minimum fuel economy goal. The operation of the vehicle is limited to speeds below the allowable vehicle operating speed. Signals indicative of vehicle fuel economy over a predetermined distance of vehicle travel are collected and stored. A determination is made as to whether the operator has met the minimum fuel economy based on the collected signals, such as percentage of operating time spent idling. The allowable vehicle operating speed is increased to an incentive speed when said operator has met the minimum fuel economy. The collected signals are replaced with newly collected signals after the vehicle has traveled the predetermined distance. The allowable vehicle operating speed is equal to the incentive speed during the interval in which the vehicle has not yet traveled the predetermined distance of vehicle travel.

14 Claims, 4 Drawing Sheets

OTHER PUBLICATIONS

Internet article at www.foodlogistics.com/archives/0109.html, Vercillo, Tony, "Ask Dr. Fleet: With OBCs, People Make the Difference" Food Logistics archives, (Feb./Mar. 1997).

Internet article at www.coak.cats.ohiou edu/~bc458196/391 omnitrac,htm., "OmniTRAC Fleet Tracking System and Products Surrounding It", date unknown, author unknown.

Internat article at www.qualcomm.com/qwbs/omnitracs/stracs.html., "OmniTRACS: SensorTRACS Performance Reporting Module", author unknown, date unknown.

Internet article at www.heavytruck.com/hdt/2000/01/048a0001.html., Sturgess et al., "War on Diesel: With or without Scientific Evidence, EPA will be Back. Meantime, Heavy Duty Engine Makers Scramble to Meet Emission Challenges, " (1999/2000).

Internat article at www.ccjmagazine.com/OBC,htm., Desmond "Computers on Board: How Smart Fleets use the Data, " Commercial Carrier Journal (1996).

Internet article at www.cat.com/products/enignes n_power_systems/01_on-board/on-Highway_truck/01_truck_engine info^specs/03_electronics/driver_reward/driver_reward/driver_reward.html, "Truck Engine Info/Specs"(2000).

Internet article at www/smxc.com/newswire/andysarticle-.html., Nesler, "SMX Fuel Program Update" (2000).

Internet article at www.cummins.com "Cummins Introduces the Newest Member of its Information Systems Product Line" (1999).

Internet article at www.cummins.com "Cummins Introduces INSPEC3, INFORM 3" (1999).

Internet article at www.xata.com/products/onboardfuel/htm., "Onboard Fuel Management", author unknown (1998).

* cited by examiner

BREAK-IN PERIOD

MAXIMUM VEHICLE SPEED: REWARD SPEED

FUEL ECONOMY: 8 MPG

TARGET: 7 MPG

IDLE TIME: 23%

TARGET: 30%

MAXIMUM VEHICLE SPEED: REWARD SPEED

ENGINE CONTROL SYSTEM FOR PROVIDING INCENTIVE TO DRIVERS

FIELD OF THE INVENTION

The invention concerns vehicle control systems and more particularly an engine control system that rewards an over the highway truck operator with enhanced vehicle performance for operating the vehicle according to predetermined goals.

BACKGROUND OF THE INVENTION

Several driver reward systems have been patented that provide rewards to over the highway truck operators when the operator performs in accordance with predetermined fleet goals such as fuel economy, pollution control, noise control, engine wear minimization, and safety. An important consideration when designing these systems is the level of difficulty a fleet manager has in implementing and maintaining the system. Another consideration is whether the system integrates with normal vehicle operation to provide predictable functioning of the truck. Finally, the quality of the interface between the operator and the system is of concern.

U.S. patent application Ser. No. 09/535,098 incorporated herein by reference, concerns an engine control system that rewards a driver with increased attainable speed if he is wearing his seat belt. U.S. Pat. No. 6,026,784 to Weisman et al. concerns a system of engine control that provides a driver with a reward of increased allowed speed. The system includes a microprocessor that reads signals provided by various vehicle components and determines whether the operator is operating the vehicle according to a fuel economy goal. When the operator meets the goal, he is rewarded with an incremental increase in road speed and/or cruise speed maximum limits that are controlled by an electronic engine control module that determines the fuel flow to the engine.

U.S. Pat. No. 5,954,617 to Horgan et al. concerns a system for controlling internal combustion engine performance in accordance with driver behavior. The system described in the '617 patent contemplates monitoring a range of vehicle operating goals and provides driver incentives including increased allowable speed and increased engine output. The system accumulates "reward" time and "penalty time" for behaviors that either meet goals or fall below goals.

SUMMARY OF THE INVENTION

The engine control system of the present invention provides incentive to a driver for driving in a manner that improves fuel economy and reduces engine wear, noise, and pollution. Because it does not require a manual reset, the system is essentially maintenance free from the view of fleet managers and due to its simplicity it is easily understood by drivers. The system of the present invention integrates into an existing vehicle display and keeps the driver informed as to the maximum attainable speed of his vehicle at any time.

In an embodiment of the invention, an incentive is provided to an operator of a vehicle for meeting at least one predetermined performance goal. Signals indicative of vehicle function related to operator performance are collected and stored over a predetermined distance. Based on the collected signals, it is determined whether the operator has met the performance goal. The incentive is provided to the operator if the performance goal has been met. The collected signals are replaced with newly collected signals after the vehicle has traveled the predetermined distance.

In the preferred embodiment of the invention a vehicle operating speed limit is established and the operation of the vehicle is limited to the vehicle operating speed limit. A default maximum vehicle speed and an incentive speed limit are established, with the incentive speed exceeding the default maximum speed. If the operator meets a fuel economy goal, the vehicle operating speed limit is set to the incentive speed limit.

According to a feature of the invention, fuel economy is calculated by dividing the miles traveled by the vehicle by a fuel rate for the vehicle. According to another feature of the invention, fuel economy is based on a maximum percentage of vehicle operating time spent idling. The percentage of vehicle operating time spent idling is calculated by accruing time on a timer when vehicle speed is zero mph, engine speed is greater than zero rpm, and engine torque is below a predetermined limit. In an exemplary embodiment, the timer does not begin accruing time until after a predetermined delay time after the vehicle begins to idle.

In an embodiment of the invention, the operator can operate the vehicle at the incentive speed during the interval in which the vehicle has not yet traveled the predetermined distance during which signals are collected. In a preferred embodiment, the incentive speed is only provided to the operator if he is wearing the safety belt and the vehicle operating speed only changes at ignition cycles. In an exemplary embodiment, the maximum vehicle operating speed is displayed to the operator until the operator confirms the change by actuating a button.

Further advantages and a fuller understanding of the invention will be had from the accompanying drawings and the detailed description of the invention.

DETAILED DESCRIPTION OF THE PREFERRED EMBODIMENT

Figure 1:
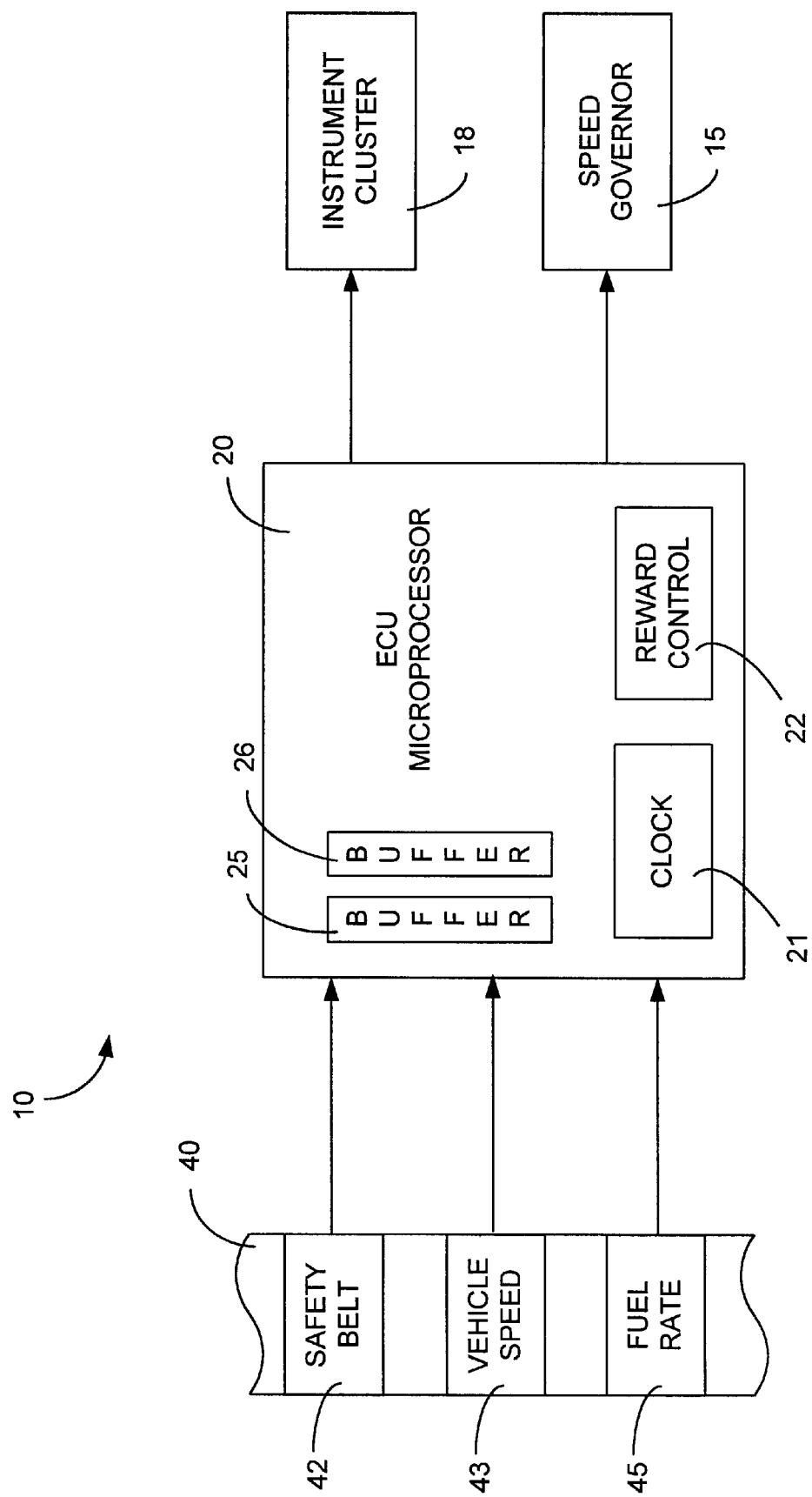
FIG. 1 is a block diagram of an engine control system in accordance with a preferred embodiment the present invention.

Referring to FIG. 1, a block diagram of an engine/vehicle control system 10 for use in a vehicle (not shown) in accordance with the present invention is depicted. An engine control unit microprocessor 20 receives data from a data bus 40 regarding the current operation of the vehicle. A safety belt signal 42 indicates whether a driver has the seat belt engaged. A vehicle speed signal 43 can be generated numerous ways. In one embodiment, wheel sensors can sense wheel rotation, and hence vehicle speed. In alternative embodiments, data regarding transmission gear status or other engine parameters is used to determine the vehicle speed. The vehicle speed signal 43 is input to the microprocessor 20 as well as a signal representing an engine fuel rate 45.

The microprocessor 20 features an internal clock 21. A reward control module 22 calculates a fuel economy value and a percent idle time value using the vehicle speed signal 43 and the fuel rate signal 45. Two buffers 25, 26 receive and store the fuel economy data and idle time data, respectively. The reward control module provides updated information to the buffers 25, 26 during a predetermined distance traveled interval, for the purposes of this description 1000 miles. Once the buffers have filled, the reward control overwrites entries in the buffers that have been first entered. In this manner, the buffers store data from the last 1000 miles of vehicle operation. The operation of the buffers 25, 26 will be more fully illuminated by Example 1.

The reward control module 22 accesses the stored data in the buffers 25, 26 and the internal clock 21 to calculate values for fuel economy and idle time. Fuel economy is calculated by dividing the number of miles traveled as sensed by an engine speed sensor (not shown) by the vehicle fuel rate (shown in FIG. 1). Idle time, expressed as a percent of engine on time spent idling is calculated by a timer that accrues time when the following criteria are met: 1) vehicle speed of 0 mph, 2) engine speed greater than 0 rpm, and 3) engine torque (not shown) below a predetermined limit. In a preferred embodiment of the invention, a lag period is incorporated into the idle time calculation so that the vehicle must be stopped with the engine on for over a certain amount of time, for example 90 seconds for idle time to begin accruing. This feature prevents a driver from being penalized by stopping for a traffic light or operating in heavy traffic.

The reward module refers to the calculated fuel economy and idle time to determine whether the vehicle is being operated within predetermined goal ranges for fuel economy and idle time. If the vehicle is being operated within the goal ranges, the reward control module provides an output to an instrument cluster 18 and a speed governor 15 at the next ignition cycle to notify the driver that an increased vehicle speed is allowed and to adjust the speed governor's maximum speed allowed to the reward speed value. In a preferred embodiment, the reward control module 22 does not allow the vehicle to be driven at the reward speed value unless the driver is wearing his seat belt.

The reward control module 22 relies on stored goal ranges for fuel economy and idle time that are programmed when the vehicle is assembled. A purchaser of the vehicle selects whether the engine/vehicle control system 10 should be enabled, and if so selects goal ranges for fuel economy and idle time. In a preferred embodiment, the purchaser may select whether fuel economy, or idle time, or both determine if the reward speed is attainable. In addition, the purchaser selects a standard speed maximum and a reward speed maximum, generally a five mile per hour increase over the standard speed. The purchaser also selects the distance interval over which the buffer stores data, generally between 1000, and 10,000 miles. Once these values have been stored in the reward control module, no further action on the part of the purchaser is required unless they wish to change a value. Because the reward module 22 overwrites the buffers 25, 26 when they are full, it is not necessary to reset the system manually or via wireless communication.

Figure 2:
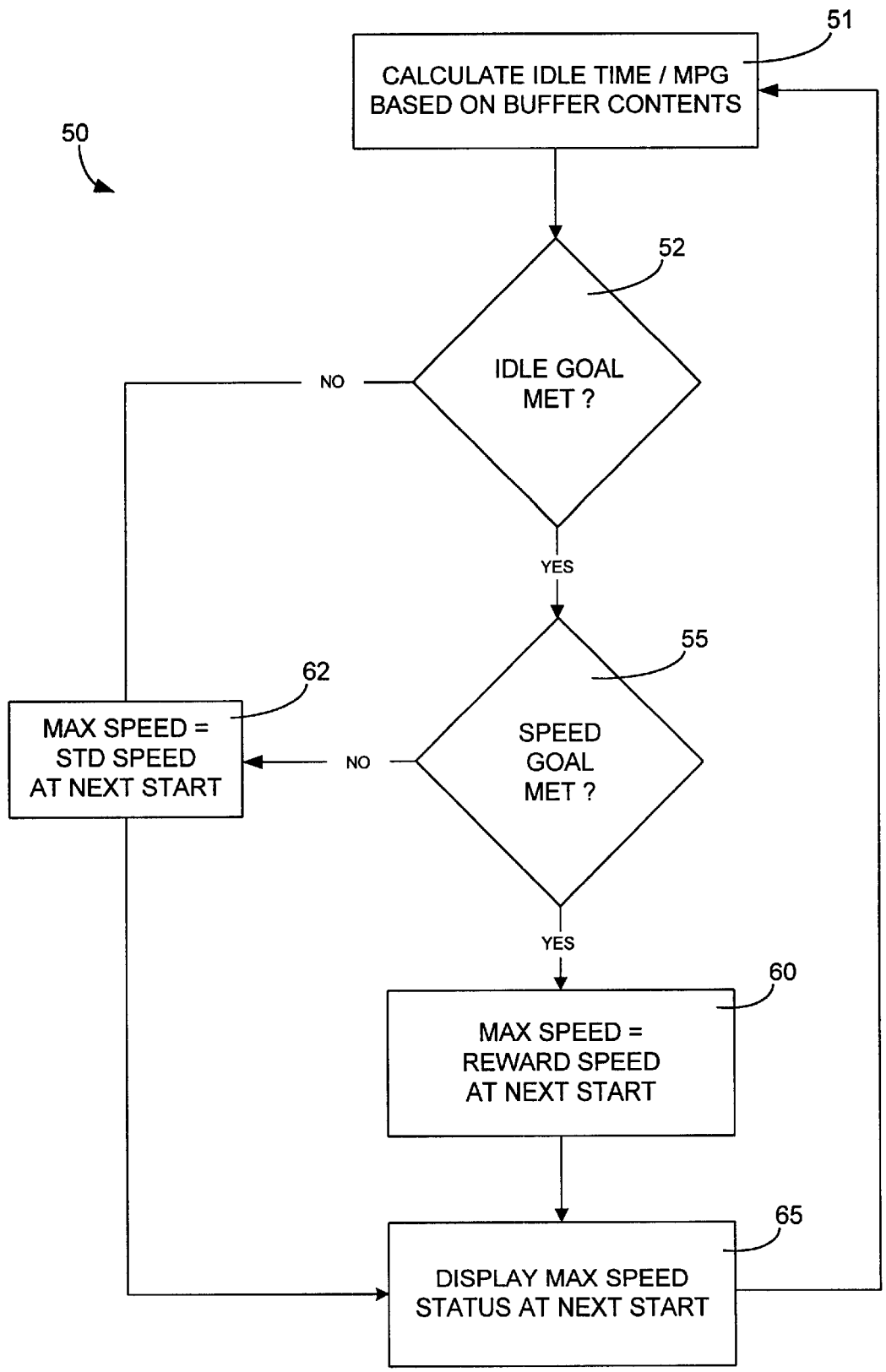
FIG. 2 is a flow chart depiction of the function of the engine control system of FIG. 1.

Referring now to FIG. 2, a flow chart illustrating a reward control algorithm 50 used by the reward control module 22 to determine whether the vehicle can be operated at the standard or reward speed is shown. During the break in period, the driver is allowed to drive at the reward speed. After this break in period, in step 51 idle time and fuel economy are calculated based on the current content of the buffers. In step 52 the calculated idle time is compared to the goal range to determine if the goal has been met. If the idle time goal is not met, the maximum attainable speed is set to the standard speed value at the next vehicle start in step 62. If the idle time goal is met, the algorithm moves to step 55 in which the calculated fuel economy is compared to the goal range. Like idle time, if the fuel economy goal is not met, the maximum vehicle speed is set to the standard speed at the next vehicle start in step 62.

If the fuel economy goal is met, the maximum vehicle speed is set to the reward speed at the next vehicle start. The maximum vehicle speed is displayed in step 65 at the next vehicle start. The maximum vehicle speed changes only at vehicle start so that the driver is always aware of the maximum attainable speed for his vehicle, which is displayed at each vehicle start until the driver confirms the change by actuating a button. In an exemplary embodiment of the invention, the reward control module does not allow a vehicle to be operated above the standard maximum speed unless the driver is wearing his seat belt.

EXAMPLE 1

Figure 3A:
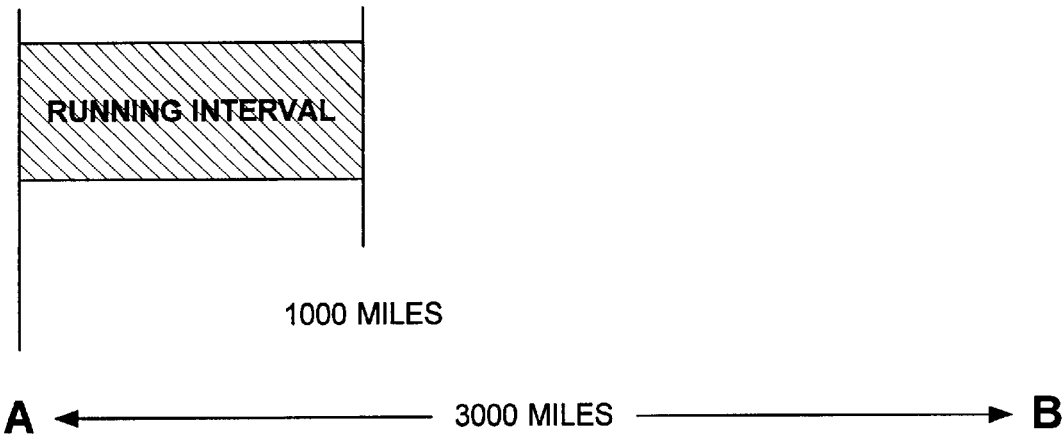
FIGS. 3A–3C illustrate an example of the operation of the engine control system of FIG. 1.
Figure 3B:
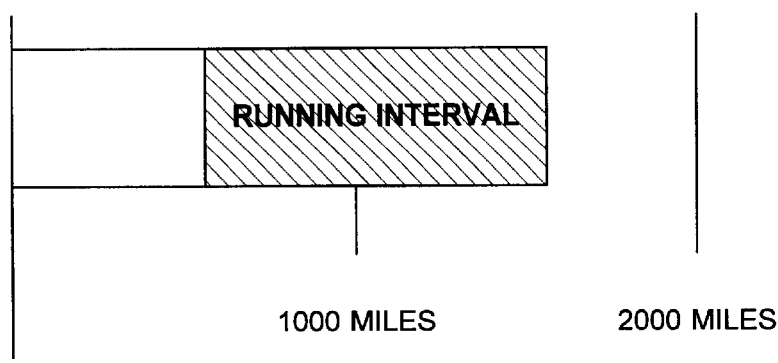
Figure 3C:
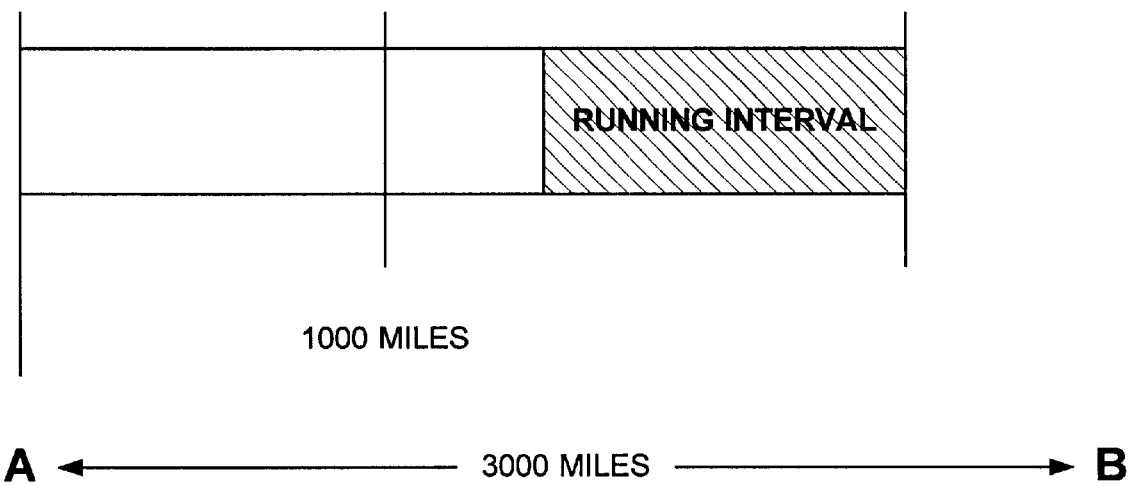

FIGS. 3A to 3C illustrate an example of the operation of an engine control system constructed in accordance with the present invention. For the purposes of the example, the running interval is 1000 miles, the idle time target is 30%, and the fuel economy goal is 7 miles per gallon. Three thousand miles of vehicle travel are represented by the bottom axis of the figure. FIG. 3A depicts the break in period or first 1000 miles of vehicle travel after the engine control system is enabled. The maximum vehicle speed is the reward speed. FIG. 3B illustrates operation of the system once the vehicle has traveled more than 1000 miles. The engine control system is active to provide the driver with the reward speed due to the achieved fuel economy of 8 MPG and idle time of 23%. FIG. 3C illustrates the operation of the system once the vehicle has traveled beyond the point shown in FIG. 3B. The engine control system provides the driver with the standard speed because the idle time value of 32% is above the goal value of 30%.

The preferred embodiments of the invention have been illustrated and are described in detail. However, the present invention is not to be considered limited to the precise construction disclosed. Various adaptations, modifications and uses of the invention may occur to those skilled in the art to which the invention relates and the intention is to cover hereby all such adaptations, modifications and uses which fall within the spirit or scope of the appended claims.

I claim:

1. A method of providing an incentive to an operator of a vehicle for meeting at least one predetermined performance goal, wherein said vehicle has an operation cycle comprising a period of vehicle operation beginning with engine ignition and ending with engine shut down, said method comprising:

collecting and storing signals indicative of vehicle function related to operator performance over a predetermined distance of vehicle travel during a plurality of operation cycles;

determining whether said operator has met said at least one performance goal over said predetermined distance of travel based on said collected signals;

providing said incentive to said operator during a subsequent operation cycle if said performance goal has been met; and replacing said collected signals with newly collected signals after said vehicle has traveled said predetermined distance.

2. The method of claim 1 comprising the following steps:

setting a vehicle operating speed limit and limiting operation of said vehicle to said vehicle operating speed limit;

establishing a default maximum vehicle speed and an incentive speed limit, wherein said incentive speed exceeds said default maximum speed;

wherein the step of providing said incentive to said operator is performed by setting said vehicle operating speed limit to said incentive speed limit.

3. The method of claim 1 wherein said performance goal is a minimum fuel economy.

4. The method of claim 3 wherein said fuel economy is calculated by dividing the miles traveled by said vehicle by a fuel rate for said vehicle.

5. The method of claim 1 wherein said performance goal is a maximum percentage of vehicle operating time spent idling.

6. The method of claim 4 wherein said percentage of vehicle operating time spent idling is calculated by accruing time on a timer when vehicle speed is zero mph, engine speed is greater than zero rpm, and engine torque is below a predetermined limit and wherein said timer does not begin accruing time until after a predetermined delay time after the vehicle begins to idle.

7. The method of claim 1 wherein said incentive is provided to said operator during initial operation cycles that occur prior to the vehicle traveling said predetermined distance of vehicle travel.

8. The method of claim 1 comprising the step of determining whether said operator is wearing a safety belt and wherein the step of providing said incentive to said operator is performed if said operator is wearing said safety belt.

9. A method of providing an incentive in the form of increased allowable vehicle operating speed for meeting a minimum fuel economy goal, wherein said vehicle has an operation cycle comprising a period of vehicle operation beginning with engine ignition and ending with engine shut down, said method comprising:

controlling the operation of said vehicle to limit the operation of said vehicle to speeds below said allowable vehicle operating speed;

collecting and storing signals indicative of vehicle fuel economy over a predetermined distance of vehicle travel during a plurality of operation cycles;

determining whether said operator has met said minimum fuel economy based on said collected signals over said predetermined distance of travel;

increasing said allowable vehicle operating speed to an incentive speed during a subsequent operation cycle when said operator has met said fuel economy; and replacing said collected signals with newly collected signals after said vehicle has traveled said predetermined distance.

10. The method of claim 9 wherein said determining step is performed by calculating a percentage of operating time said vehicle spends idling.

11. The method of claim 9 wherein said allowable vehicle operating speed is equal to said incentive speed during initial operation cycles that occur prior to the vehicle traveling said predetermined distance of vehicle travel.

12. The method of claim 9 comprising the step of determining whether said operator is wearing a safety belt and wherein the step of increasing said allowable vehicle speed is performed if said operator is wearing said safety belt.

13. A computer readable medium containing instructions for performing a method of providing an incentive in the form of increased allowable vehicle operating speed for meeting a minimum fuel economy goal, wherein said vehicle has an operation cycle comprising a period of vehicle operation beginning with engine ignition and ending with engine shut down, said method comprising the steps of:

controlling the operation of said vehicle to limit the operation of said vehicle to speeds below said allowable vehicle operating speed;

collecting and storing signals indicative of vehicle fuel economy over a predetermined distance of vehicle travel during a plurality of operation cycles;

determining whether said operator has met said minimum fuel economy based on said collected signals;

increasing said allowable vehicle operating speed to an incentive speed during a subsequent operation cycle when said operator has met said fuel economy; and replacing said collected signals with newly collected signals after said vehicle has traveled said predetermined distance.

14. The method of claim 1 wherein said incentive is provided at the beginning of a given operation cycle and is maintained throughout the entire operation cycle.

* * * * *